United States Patent
Pullini

(10) Patent No.: US 8,188,728 B2
(45) Date of Patent: May 29, 2012

(54) METHOD AND DEVICE FOR DETERMINING THE RELATIVE POSITION OF TWO ELEMENTS THAT ARE MOBILE WITH RESPECT TO ONE ANOTHER

(75) Inventor: Daniele Pullini, Orbassano (IT)

(73) Assignee: C.R.F. Societá Consortile per Azioni, Orbassano (IT)

( * ) Notice: Subject to any disclaimer, the term of this patent is extended or adjusted under 35 U.S.C. 154(b) by 1160 days.

(21) Appl. No.: 11/944,344

(22) Filed: Nov. 21, 2007

(65) Prior Publication Data

US 2008/0136656 A1 Jun. 12, 2008

(30) Foreign Application Priority Data

Nov. 21, 2006 (EP) ..................................... 06425791

(51) Int. Cl.
*G01B 7/14* (2006.01)
(52) U.S. Cl. .................................................. 324/207.24
(58) Field of Classification Search ... 324/207.2–207.25
See application file for complete search history.

(56) References Cited

U.S. PATENT DOCUMENTS

| 7,710,109 B2* | 5/2010 | Baak ......................... 324/207.24 |
| 2002/0067162 A1* | 6/2002 | Dammkohler et al. .. 324/207.21 |
| 2005/0143643 A1 | 6/2005 | Mimai et al. |

FOREIGN PATENT DOCUMENTS

| EP | 0894473 | 2/1999 |
| EP | 1298890 | 4/2003 |

OTHER PUBLICATIONS

European Search Report for Epo Application No. 06425791, dated Oct. 5, 2007.

* cited by examiner

*Primary Examiner* — Jay Patidar
(74) *Attorney, Agent, or Firm* — Klarquist Sparkman, LLP

(57) ABSTRACT

Described herein are a method and a device for determining the relative position of two elements that are mobile with respect to one another, in which connected to a first element is a source of a field of forces and connected to a second element is a meter, designed to measure the field of forces and to supply, instant by instant and as a function of the measurement made, a response identifying the relative position of the first element with respect to the second element at that instant, the meter being provided with at least three field sensors arranged in respective distinct points of the second element, and the response being obtained by comparing with one another the outputs corresponding to that instant.

13 Claims, 9 Drawing Sheets

METHOD AND DEVICE FOR DETERMINING THE RELATIVE POSITION OF TWO ELEMENTS THAT ARE MOBILE WITH RESPECT TO ONE ANOTHER

CROSS REFERENCE TO RELATED APPLICATIONS

This application claims the benefit of European Patent Application No. 06425791.8 filed Nov. 21, 2006, the entire contents of which hereby are incorporated by reference.

FIELD

The present invention relates to a method and device for determining the relative position of two elements that are mobile with respect to one another.

BACKGROUND

Currently, in order to determine the position of mobile elements of the type described above it is known to use a device comprising a source of a field of forces, normally a magnetic or electrical dipole, which is located on one of the two elements, preferably on the mobile element, and a field sensor, which is set in a given point of the other element, preferably the fixed one, and has the function of measuring, instant by instant, the field of forces in that point in order to produce, on the basis of said measurement, a response identifying the relative position of the source with respect to the sensor itself.

A device of this type, even though commonly used for its characteristics of simplicity and economy, presents, however, some considerable drawbacks, which derive principally from the relatively high approximation of the response supplied, which renders the device itself ineffective, if not even unserviceable, in the cases where a high precision of measurement is required.

Said approximation is intrinsic to the known type of device described above and derives from the fact that, since the sensors commonly used are sensitive both to the direction and to the modulus of the field vector, the sensor produces, for a given position of the source, a response that is a function both of the intensity and of the direction of the field generated by the source in that position.

It follows that the sensor supplies the same response for all the intensity-direction pairs that produce the same output in the sensor, even though each pair corresponds to a respective different position of the source.

In graphic terms, if the response of the sensor is represented in a reference system centred in the source, it is noted that, for a given value of the field corresponding to a given position of the source, the output of the sensor does not identify a precise point, corresponding to the point in which the source is located, but a set of points forming a complex surface, each corresponding to a position in which the source could be located. In practice, the complex surface referred to above is an iso-output surface formed by the locus of the points that, if occupied by the source, determine issuing, by the sensor, of the same output.

SUMMARY

The aim of the present invention is to provide a method and a device for determining the relative position of two elements that are mobile with respect to one another, in particular in the cases where a high level of precision of response is required and, at the same time, ease and economy of construction and use.

The present invention finds advantageous application in the techniques of automation, in which, for numerous applications, it is necessary to know, instant by instant, the precise position of a mobile element with respect to a fixed element in such a way as to be able to determine and, consequently, control the law of displacement of the mobile element.

This need is particularly felt in regard, for example, to determination of the laws of movement of shafts, mobile parts of ABSs, phonic wheels, electromechanical actuators, pistons, and valves for controlling electro-injectors and intake and exhaust valves, to which the ensuing treatment will make explicit reference, without this implying any loss of generality.

The present invention envisages applying to a first one of the two elements a source of a field of forces and measuring the field of forces using three sensors set in respective distinct points of the second element and designed to issue respective outputs, the response being obtained by comparing the outputs of said three sensors with one another.

In particular, the outputs, for one and the same instant, of the sensors are compared with one another to obtain, for each sensor, a respective iso-output surface formed by the locus of the points that, if occupied by the source, determine issuing, by the sensor, of the same output, the response being obtained by determining a point of intersection of the iso-output surfaces with one another.

Preferably, the field of forces is a magnetic field.

According to a preferred embodiment, one of the elements is mobile and the other is fixed; in particular, the first element is mobile and the second element is fixed, and the first element is a valve.

Preferably, the points in which the sensors are arranged are substantially equidistant from the source.

BRIEF DESCRIPTION OF THE DRAWINGS

The invention will now be described with reference to the annexed plate of drawings, which illustrates a non-limiting example of embodiment thereof and in which.

DETAILED DESCRIPTION

Figure 1:
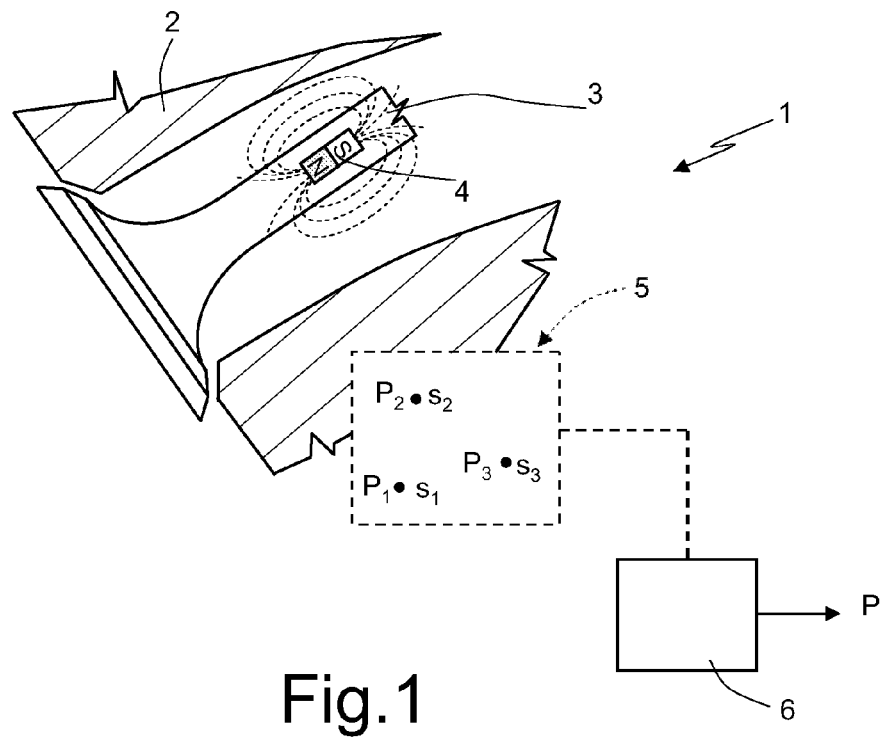
FIG. 1 illustrates a first preferred embodiment of the device of the present invention.

In FIG. 1, designated as a whole by 1 is a device for determining the relative position of two elements that are mobile with respect to one another. These two mobile elements can be both mobile according to different laws or else one can be fixed and the other mobile.

In the example illustrated, which regards the latter case, one of the two elements is defined by a cylinder head 2 of an internal-combustion engine, and the other element is defined by an intake valve 3, which is mobile with respect to the cylinder head 2 away from and towards an operative position of opening (illustrated in FIG. 1).

The device 1 comprises a source of a magnetic field, constituted, in the example illustrated, by a permanent magnet 4, set on the valve 3 and designed to generate a magnetic field, the lines of force of which are schematically illustrated with dashed lines in FIG. 1.

It should be pointed out that the orientation of the magnet 4 on the valve 3 illustrated in FIG. 1 is provided purely by way of example and, according to further embodiments, the magnet 4 may be set transversely, or according to any other orientation, with respect to the direction of reciprocating displacement of the valve 3.

In addition to the magnet 4, the device 1 comprises a meter 5, which in turn comprises three magnetic-field sensors $s_1$, $s_2$, $s_3$, which are arranged on the cylinder head 2 in respective points $P_1$, $P_2$, $P_3$ distinct from one another and, preferably, substantially equidistant, at each instant, from the magnet 4.

In particular, as will be explained in detail in what follows with some cases provided purely by way of example, the position of the sensors $s_1$, $s_2$, $s_3$ is established in such a way as to satisfy given analytical conditions according to the characteristic of response of each of the sensors used.

The device 1 further comprises a processing unit 6, which is connected to the sensors $s_1$, $s_2$, $s_3$ for receiving, from the sensors $s_1$, $s_2$, $s_3$ themselves, respective outputs $x_1$, $x_2$, $x_3$ and producing a response identifying the position of the magnet 4 with respect to the meter 5, or else the position of the valve 3 with respect to the cylinder head 2.

The sensors $s_1$, $s_2$, $s_3$ are magnetic sensors of a known type, for example sensors of an AMR, Hall, GMR, or MTJ type in any one of their numerous embodiments used (conventional technologies, thin-film technologies, heterostructures, technologies based upon nanowires, nanoparticles, or hybrids).

In general terms, operation of a magnetic-field sensor of a known type, such as $s_1$, $s_2$, $s_3$, consists in detecting, as a function of its own characteristics of response, the value that the vector field assumes in the point in which the sensor itself is positioned.

Since each sensor $s_1$, $s_2$, $s_3$ issues a respective output $x_1$, $x_2$, $x_3$ that is a function both of the modulus and of the direction of the magnetic vector field in the respective point $p_1$, $p_2$, $p_3$ in which the sensor $s_1$, $s_2$, $s_3$ itself is set, it happens that each sensor $s_1$, $s_2$, $s_3$ will issue the same output if it is set in a given number of points in which the field vector, albeit different in absolute value, is such as to produce the same output in the sensor.

Figure 2:
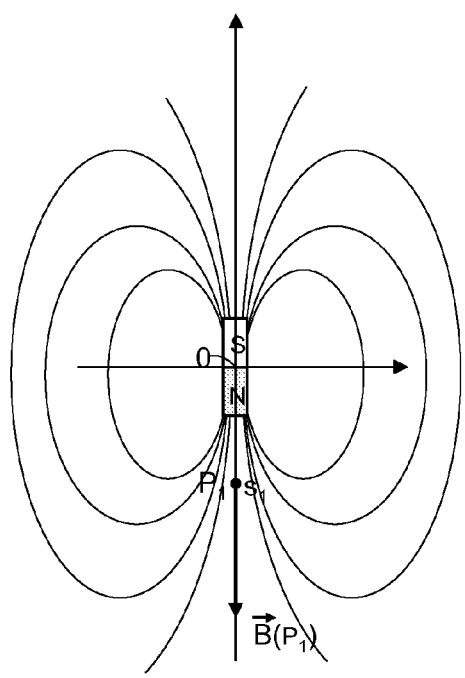
FIGS. 2 and 3 illustrate the lines of field of a magnetic source.
Figure 3:
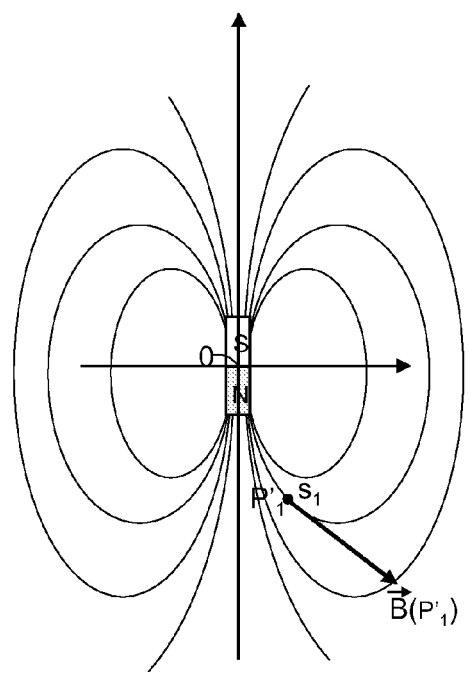

What has been obtained is exemplified in FIGS. 2 and 3, which illustrate the case where a sensor, for example $s_1$, issues the same output $x_1$, whether it is in a position $p_1$ (FIG. 2) in the presence of a field vector $B(p_1)$ or it is in a position $P'_1$ (FIG. 3) distinct from $p_1$ and in the presence of a field vector $B(P'_1)$ different from $B(P_1)$.

Figure 4:
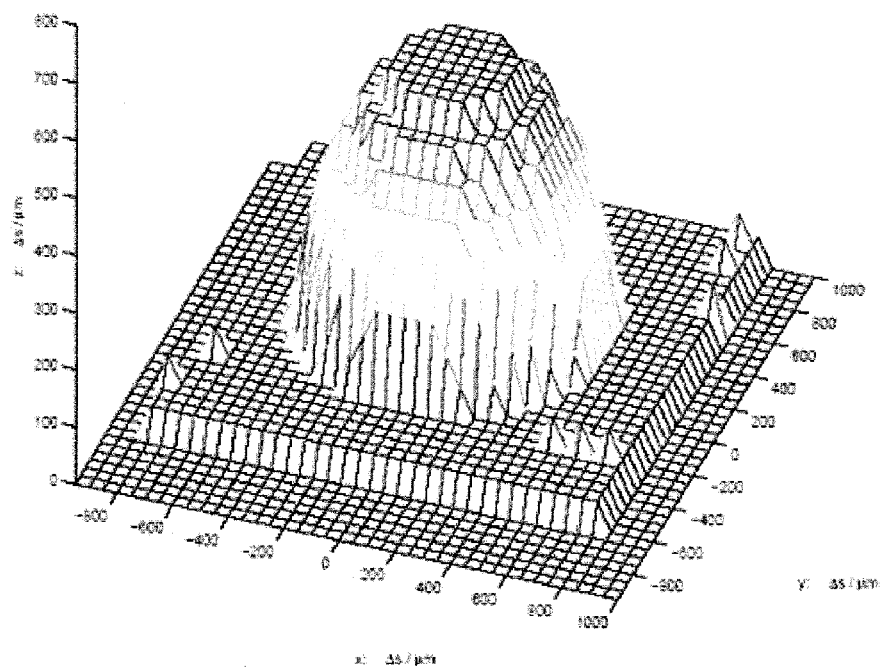
FIG. 4 illustrates an iso-output surface corresponding to a magnetic-field sensor.

It follows that, according to what is illustrated in FIG. 4, in a three-dimensional model, the output of a sensor $s_1$ ($s_2$, $s_3$), for a given position of the source, is identified by a respective surface of complex shape formed by a set of points, each of which identifies a corresponding position that the source of the field could occupy. In other words, this surface is an iso-output surface formed by the locus of the points that, if occupied by the source, would determine issuing, by the sensor, of the same output.

The sensors $s_1$, $s_2$, $s_3$ can be identical to one another or different and, according to a variant not illustrated, can be in a number greater than three.

According to other embodiments (not illustrated), the magnet 4 is replaced by a generator of an electrical field, which can be a vector field of a solenoidal type, if it is generated by an electric dipole, or else a vector field of a non-solenoidal type, if it is generated by an electric monopole.

Figure 5:
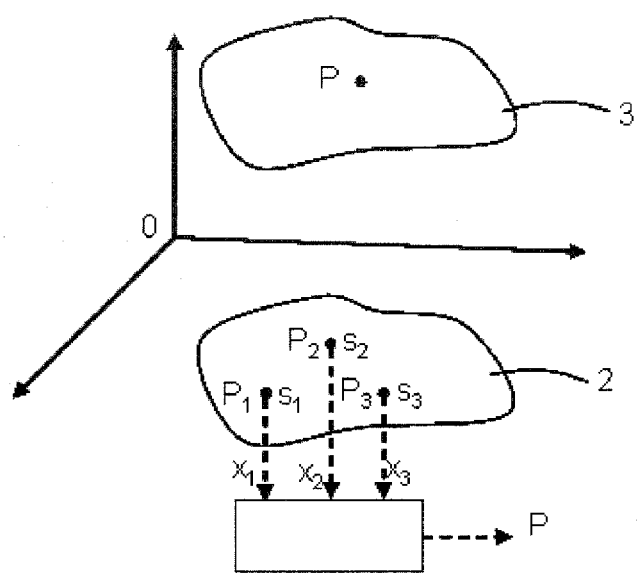
FIG. 5 is a general diagram of operation of the device of FIG. 1.

Operation of the device 1 will now be illustrated with reference to FIG. 5, in which the device 1 is ideally set in a reference system fixed with respect to the valve 3, which is instantaneously stationary in the position P.

From what has been said previously regarding operation of a single sensor, the sensors $s_1$, $s_2$, $s_3$ arranged in the points $P_1$, $P_2$, $P_3$ measure the magnetic field produced by the magnet 4 set in the position P and send respective outputs $x_1$, $x_2$, $x_3$ to the processing unit 6.

As regards positioning of the sensors $s_1$, $s_2$, $s_3$, it should be emphasized that in FIGS. 2 and 3, their arrangement is provided purely by way of example and, in actual fact, they may be located on the cylinder head 2 in respective points $P_1$, $P_2$, $P_3$ arranged, either aligned or not with respect to one another, on one and the same plane or in a three-dimensional space.

In particular, once the characteristics of response of the sensors used are known, i.e., the shape of the iso-output surface of each sensor, the points $P_1$, $P_2$, $P_3$ are fixed so as to respect given analytical conditions, which guarantee that the iso-output surfaces obtained from the outputs of the respective sensors intersect one another in a single point.

In what follows, some examples are illustrated of how the aforesaid conditions are obtained in the cases of use of sensors characterized by an iso-output surface having the shape of a hemisphere, of a hemispheroid (or a semi-ellipsoid of revolution), of a standard ellipsoid and of a rotated ellipsoid.

According to one embodiment (not illustrated), the three sensors $s_1$, $s_2$, $s_3$ may be three elements sensitive to the magnetic field integrated on a single chip.

The unit 6 processes, on the basis of the characteristics of response of the sensors $s_1$, $s_2$, $s_3$, the respective outputs $x_1$, $x_2$, $x_3$ in such a way as to determine, for each sensor $s_1$, $s_2$, $s_3$, a respective iso-output surface (FIG. 3), i.e., a surface defined by the set of points corresponding to all the positions, including P, in which the magnet 4 could be located and which, albeit distinct from P, would be identified by the sensor with the same output.

Since the aforesaid surfaces are different from one another, but each of them contains a point corresponding to the position P, the point of intersection between the surfaces calculated by the processing unit 6 identifies the single position P actually occupied, at that precise instant, by the magnet 4 and by the valve 3.

The existence of a single point of intersection between the three iso-output surfaces results, as already mentioned above, from the fact that the points $P_1$, $P_2$, $P_3$, in which the respective sensors $s_1$, $s_2$, $s_3$ are located, are fixed respecting certain analytical conditions determined on the basis of the characteristics of response of the sensors, i.e., of the shape of the respective iso-output surfaces.

Figure 8:
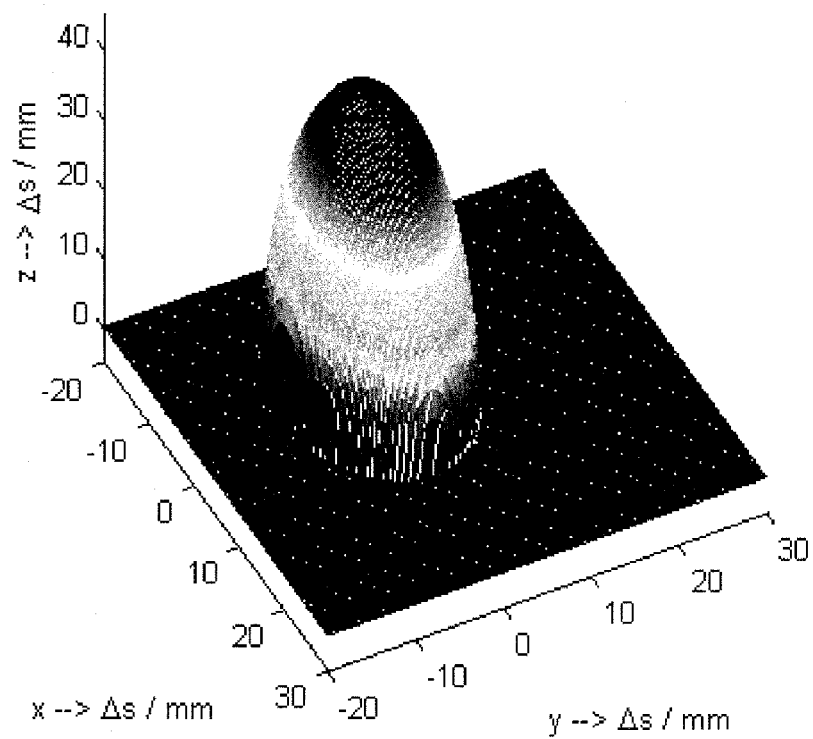
Figure 9:
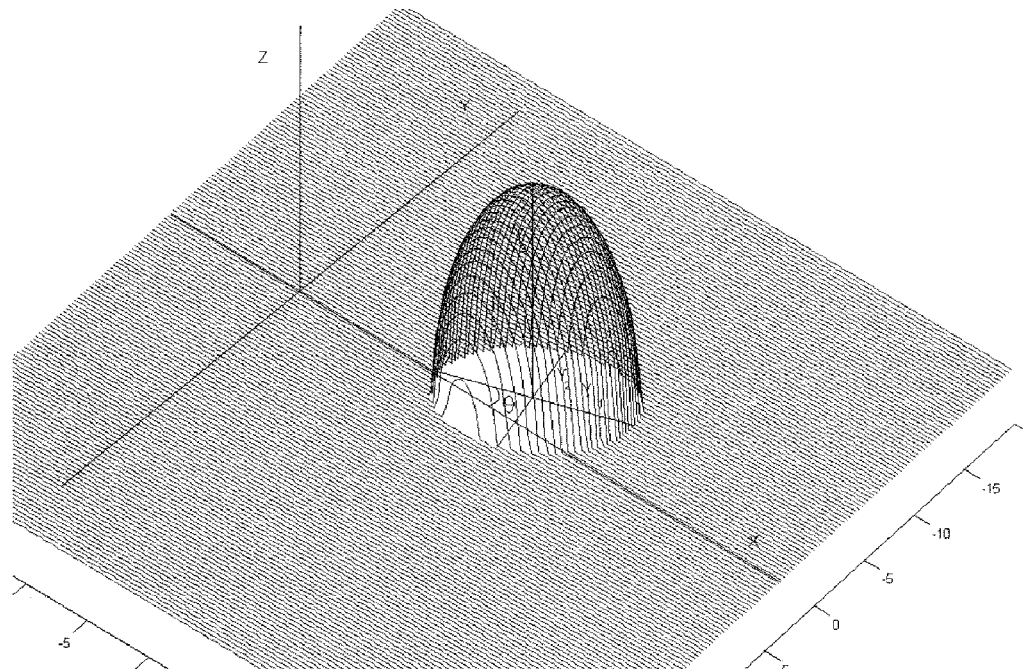

In what follows, some examples of determination of said analytical conditions are illustrated in the case where there are used:
- a) three sensors, characterized by respective iso-output surfaces having the shape of a hemisphere (FIG. 6);
- b) three sensors, characterized by respective iso-output surfaces having the shape of a hemispheroid (or semi-ellipsoid of revolution) (FIG. 7);
- c) three sensors, characterized by respective iso-output surfaces having the shape of a standard ellipsoid (FIG. 8);
- d) three sensors, characterized by respective iso-output surfaces having the shape of a rotated ellipsoid (FIG. 9).

Figure 6:
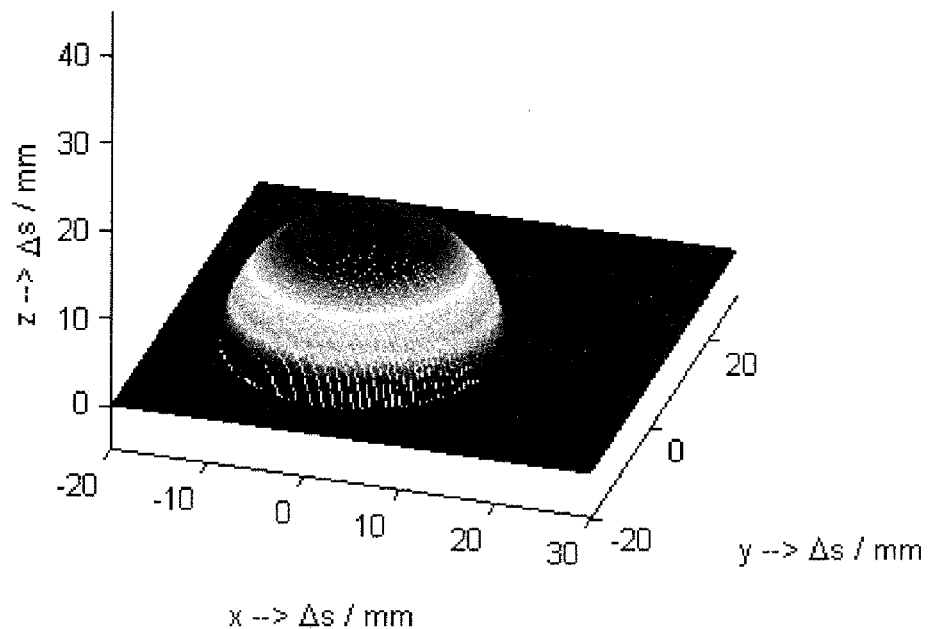
FIGS. 6-9 are schematic illustrations of respective different iso-output surfaces of corresponding sensors.

Case a): iso-output surfaces having the shape of a hemisphere (FIG. 6).

Figure 10:
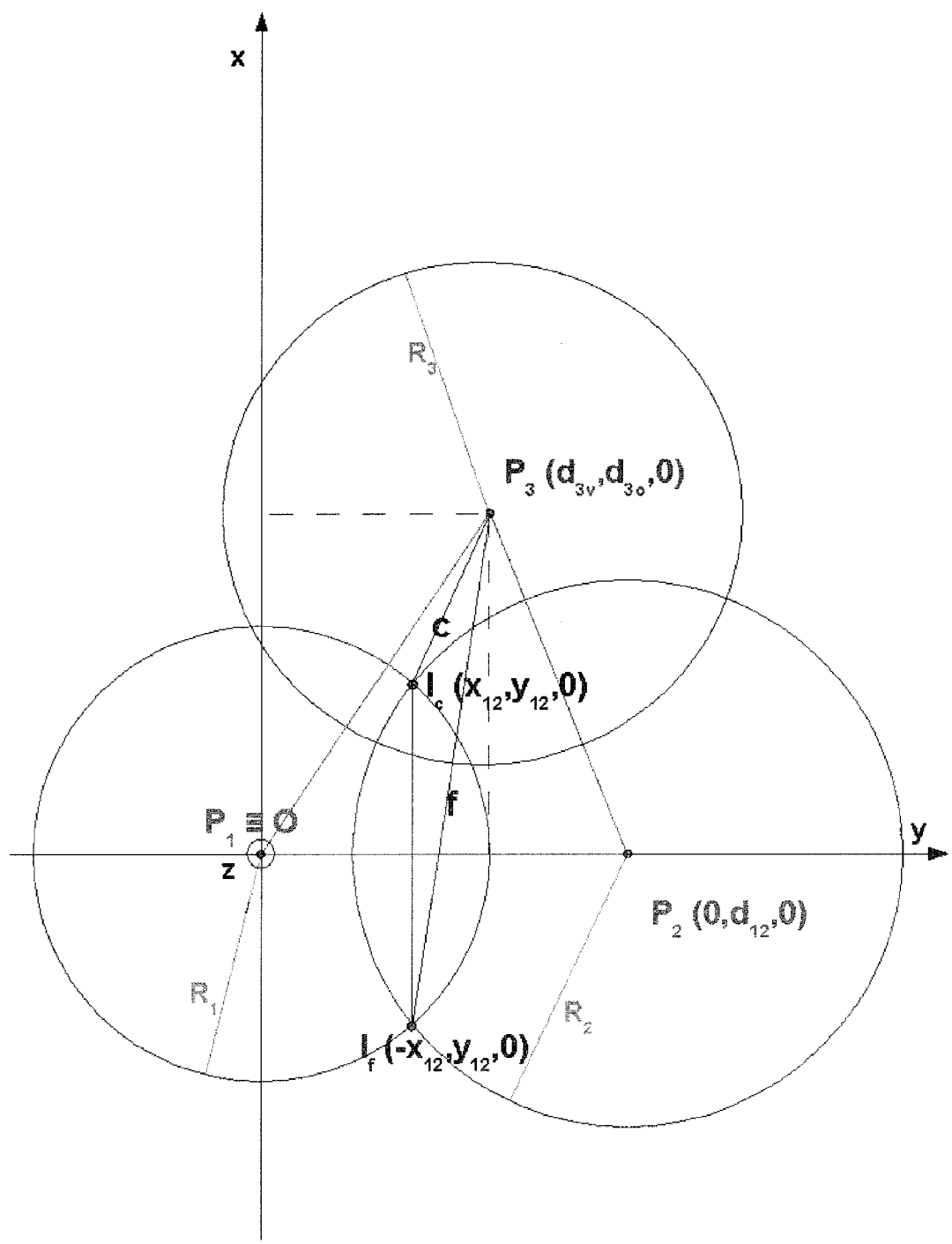
FIG. 10 illustrates the arrangement in a cartesian space of sensors characterized by iso-output surfaces having a spherical shape.

According to what is illustrated in FIG. 10, the three sensors (in what follows designated, for reasons of clarity, only by the reference numbers 1, 2, 3), are arranged at the vertices of a scalene triangle (with the vertices sufficiently non-aligned, as we shall see more clearly hereinafter) so that the first sensor is set in $P_1(0, 0)$, the second in $P_2(0, d_{12})$ and the third in $P_3(d_{3o}, d_{3v})$.

The three circles, which are centred, respectively, in $P_1(0, 0)$, $P_2(0, d_{12})$ and $P_3(d_{3o}, d_{3v})$ represent the circular bases of the respective hemispheres, each of which is defined by the corresponding hemispherical iso-output surface.

Designated by $R_1$, $R_2$ and $R_3$ are the radii of the hemispheres.

The variables $d_{12}$, $d_{3o}$, $d_{3v}$, $R_1$, $R_2$ and $R_3$ are arbitrary variables of design to be chosen respecting the following conditions in order to obtain a single intersection:

$$|R_2-R_1|<d_{12}<R_2+R_1 \text{(for the intersection of two spheres);} \quad (11.1)$$

$$c \neq f \text{(involves non-aligned sensors)} \quad (11.2);$$

$$c<R_3<fc<f$$

$$f<R_3<cf<c$$

(for uniqueness of intersection with the third sphere) (11.3);
where:

$$c=\sqrt{(d_{3v}-x_{12})^2+(d_{3o}-y_{12})^2}$$

$$f=\sqrt{(d_{3v}+x_{12})^2+(d_{3o}-y_{12})^2}$$

$I_1(x_{12}, y_{12})$ and $I_2(-x_{12}, y_{12})$ are the points of intersection between the plane (x, y) and the two hemispheres corresponding to the sensors 1 and 2.

There are then obtained the two points $I_1(x_{12}, y_{12})$ and $I_2(-x_{12}, y_{12})$ by solving the system:

$$z=\sqrt{R_1-x^2-y^2}$$

$$z=\sqrt{R_1-x^2-(y-d_{12})^2}$$

$$z=0$$

Equation (11.1) ensures that the intersection of the isosurfaces of the first two sensors is not a closed curve (in this case, it would not be possible to have a single point of intersection having excluded the case of coincident points).

Equation (11.2) excludes the possibility of aligned sensors (but is in any case expressed implicitly in Eq. (11.3)).

Equation (11.3) ensures the uniqueness of the intersection with the third sensor.

Equations (11.4) and (11.5) derive the value of c and f by applying the Pythagorean theorem.

It would be possible to use the value of the sides of the triangle instead of their co-ordinates in the plane (x, y, 0) for defining the aforesaid conditions, but it would prove in any case useful to obtain these co-ordinates by applying the Pythagorean theorem for the purposes of characterization of the triangle.

Equation (11.6) is the system that enables identification of the points of intersection between the isosurface of the first two sensors and the plane (x, y, 0).

Figure 7:
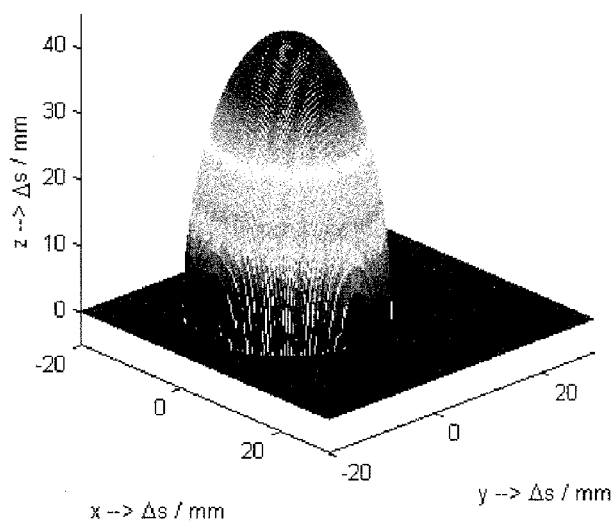

Case b): iso-output surfaces having the shape of a hemispheroid (FIG. 7).

Analytically, it is possible to obtain a surface of this type, for example by dilating by a factor k a sphere in one direction, in the example represented in the figure the axis z, or else by rotating a semi-ellipse along its semi-axis.

By applying the same conditions referred to above to obtain $I_1(x_{12}, y_{12})$ and $I_2(-x_{12}, y_{12})$ by solving, however, the following system, we obtain the conditions of single intersection for oblate hemispheroid (k<1) and prolate hemispheroid (k>1; for reasons of completeness and clarity, the case k=1 is that of the sphere appearing above).

$$z=k_1\sqrt{R_1-x^2-y^2}$$

$$z=k_2\sqrt{R_1-x^2-(y-d_{12})^2}$$

$$z=0$$

Figure 11:
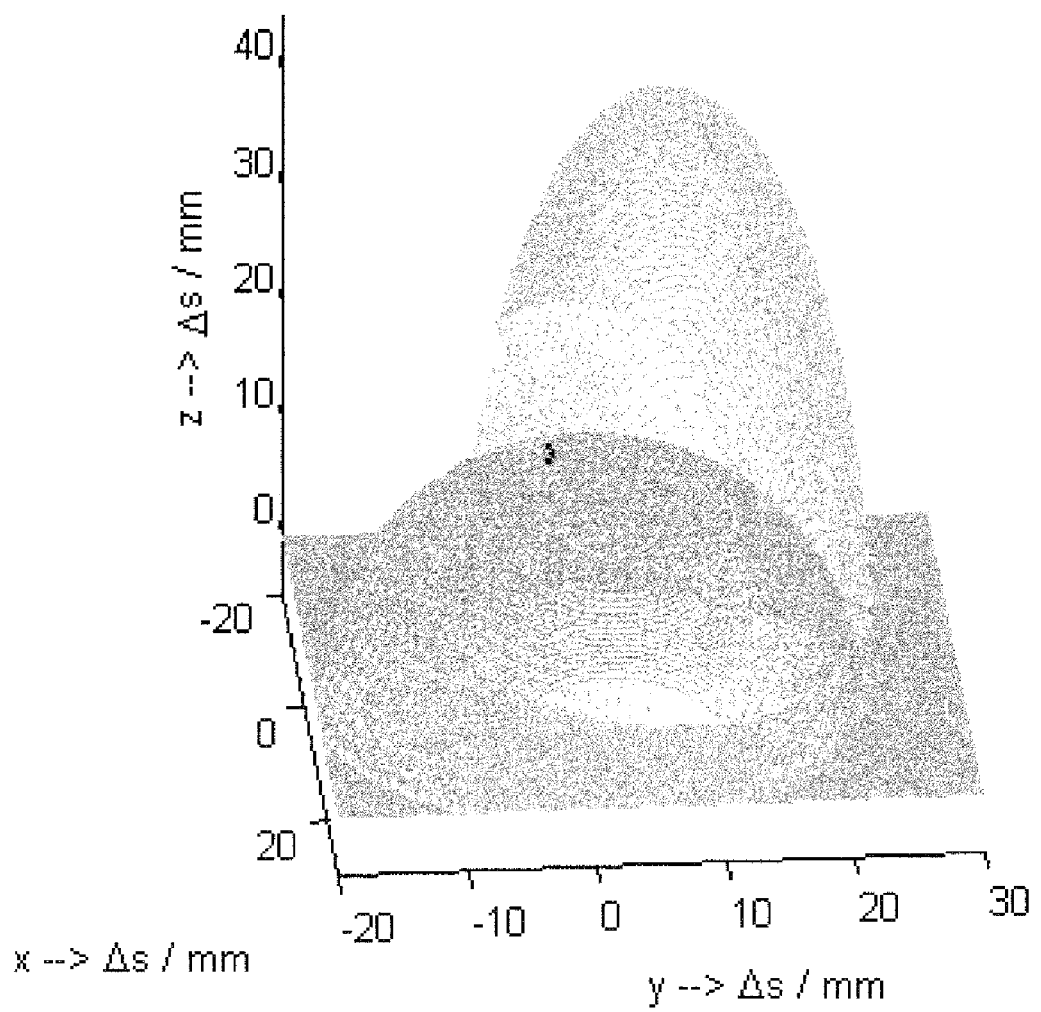
FIG. 11 illustrates the intersection of three iso-output surfaces having a hemispheroidal shape.

Illustrated by way of example is the case of use of three different sensors with iso-output surfaces of a hemispheroidal type (FIG. 11) with the following parameters:

$d_{12}=7.8$ mm $d_{3o}=11.8$ mm $d_{3v}=0.9$ mm (hence $P_1(0,0)$, $P_2(0,7.8)$ and $P_3(11.8, 0.9)$ for the three sensors)

$R_1=\sqrt{10^2+10^2}$ $R_2=\sqrt{10^2+12^2}$ $R_3=\sqrt{15^2+15^2}$ $K_1=2$ $K_2=3$ $K_3=1$ Case c): iso-output surfaces having the shape of a standard ellipsoid (FIG. 8).

Figure 12:
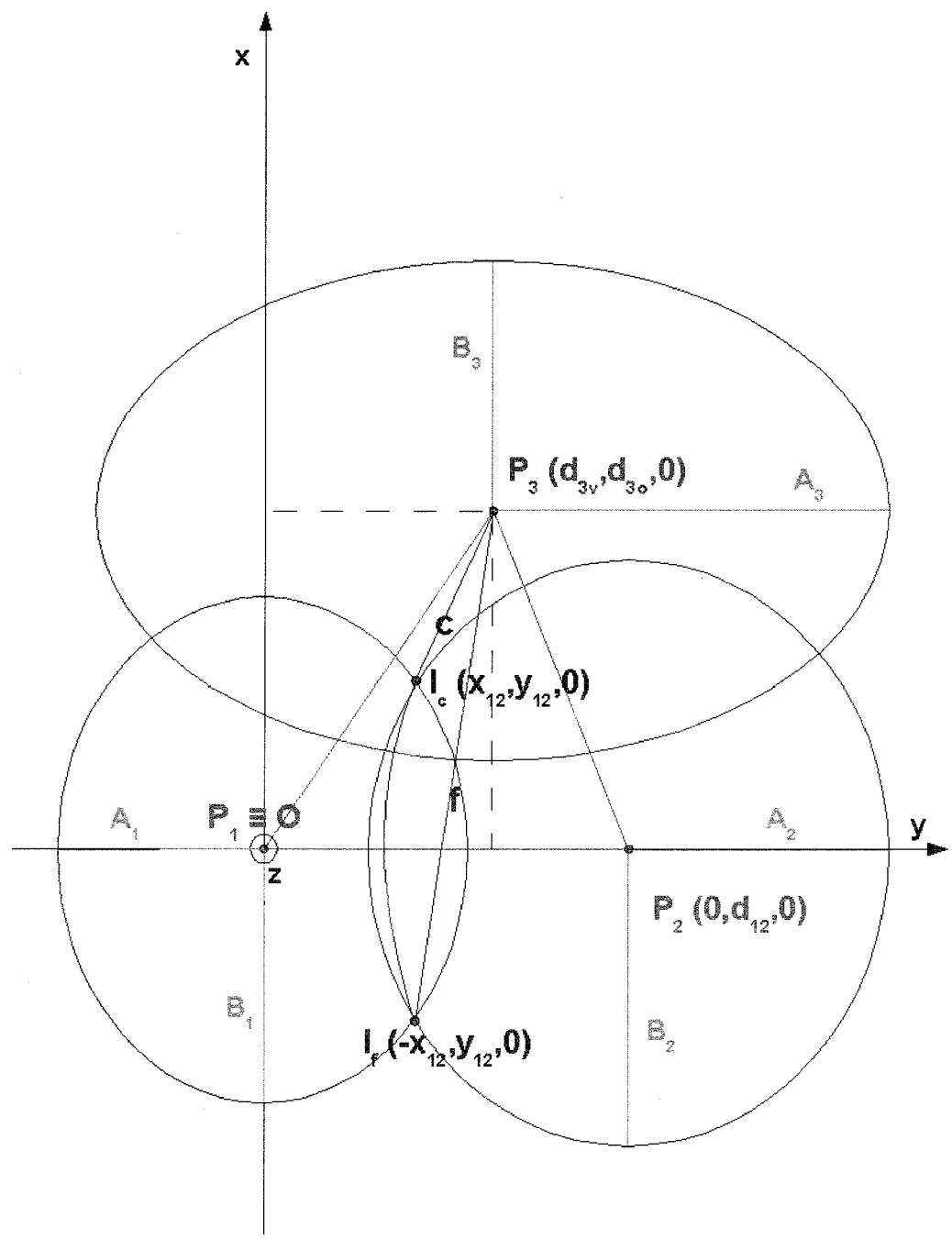
FIG. 12 illustrates the arrangement in a cartesian space of sensors characterized by iso-output surfaces having an ellipsoidal shape.

According to what is illustrated in FIG. 12, by "standard ellipsoid" is meant an ellipsoid with axes parallel to the cartesian axes.

Figure 13:
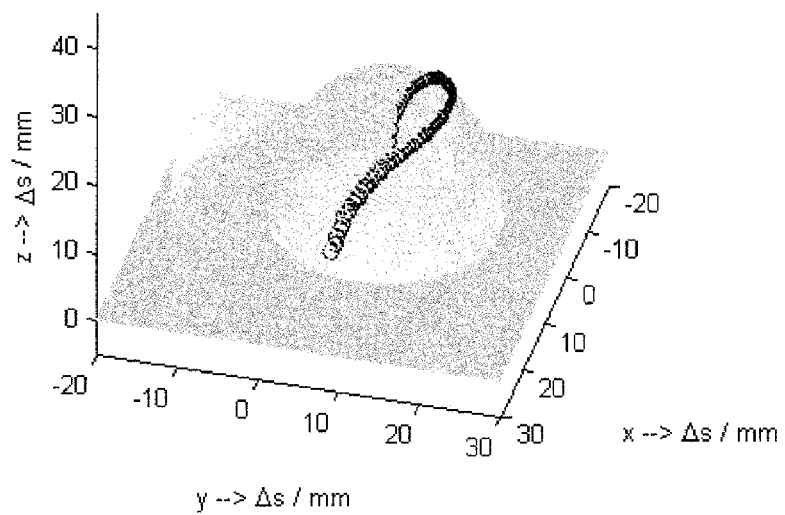
FIGS. 13 and 14 illustrate the intersection of two and, respectively, three iso-output surfaces having an ellipsoidal shape.

Since, as illustrated in FIG. 13, by intersecting two ellipsoids with the centre on the same axis a curve (in space) with three variables is obtained, to obtain a single point as intersection of three standard ellipsoids, Equations (11.x) are to be generalized to the case of an ellipse of this type. We shall have:

$$|A_2-A_1|<d_{12}<A_2+A_1 \text{(for the intersection of two ellipsoids)} \quad (16.1)$$

$$c \neq f \text{(non-aligned sensors; condition included in the subsequent condition)} \quad (16.2)$$

$I_c(x_{12}, y_{12})$ must be a point internal to the ellipse and $I_f(-x_{12}, y_{12})$ must be a point external to the ellipse; hence the sum of the distances of $I_c(x_{12}, y_{12})$ from the two foci of the third ellipse must be smaller than the sum of the distances of any point of the ellipse from the two foci, and the distance with respect to $I_f(x_{12}, y_{12})$ must be greater. (16.3) where:

$A_2$ and $A_1$ are the axes of the bases of the hemispheroids parallel to the axis y;

c and f, see (11.4) and (11.5);

$I_c(x_{12}, y_{12})$ and $I_f(-x_{12}, y_{12})$ are points of intersection between the plane (x, y) and the two semi-ellipsoids corresponding to 1 and 2.

It is possible to obtain the two points $I_c(x_{12}, y_{12})$ and $I_f(x_{12}, y_{12})$ by solving the system $$z = \sqrt{R_1 - x^2/A_1^2 - y^2/B_1^2}$$

$$z = \sqrt{R_1 - x^2/A_2^2 - (y/B_2 - d_{12})^2} \quad (16.4)$$

$$z = 0$$

Figure 14:
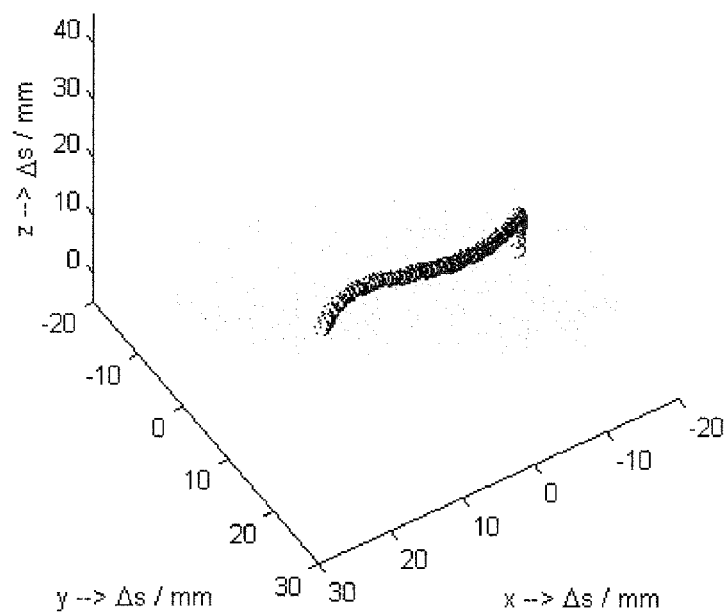

Given these conditions, we obtain a single point of intersection (FIG. 14), which is the result of the intersection of the third ellipsoid with the curve generated by the intersection of the first two ellipsoids.

Case d): iso-output surfaces having the shape of a rotated ellipsoid (FIG. 9).

This is the most general case and regard an ellipsoid that has, for example, one of the three axes ($\gamma_3$) parallel to the axis z and the other two axes ($\gamma_2, \gamma_1$) not parallel respectively to x and y, so that it is possible to define, for example, an angle $\theta$ of other than zero between the axis x and the axis of the ellipsoid $\gamma_1$.

Figure 15:
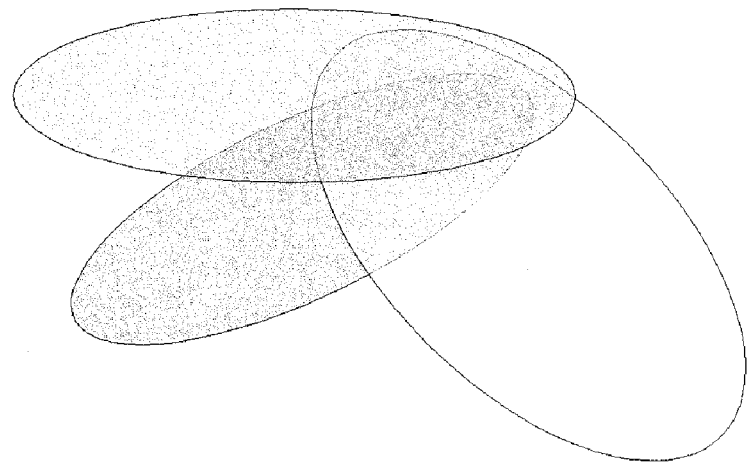
FIG. 15 illustrates the intersection of the area identified by three iso-output surfaces having an ellipsoidal shape with a plane x-y.

In this case, the condition for having a single point of intersection is the following (see, for reference, FIG. 15): each elliptical base of the semi-ellipsoids must intersect with each of the other two bases without including it totally, and each elliptical base must include within it one and only one of the two points identified by the intersection of the perimeters of the other two elliptical bases.

This condition is also the generalization of all the previous cases.

Figure 16:
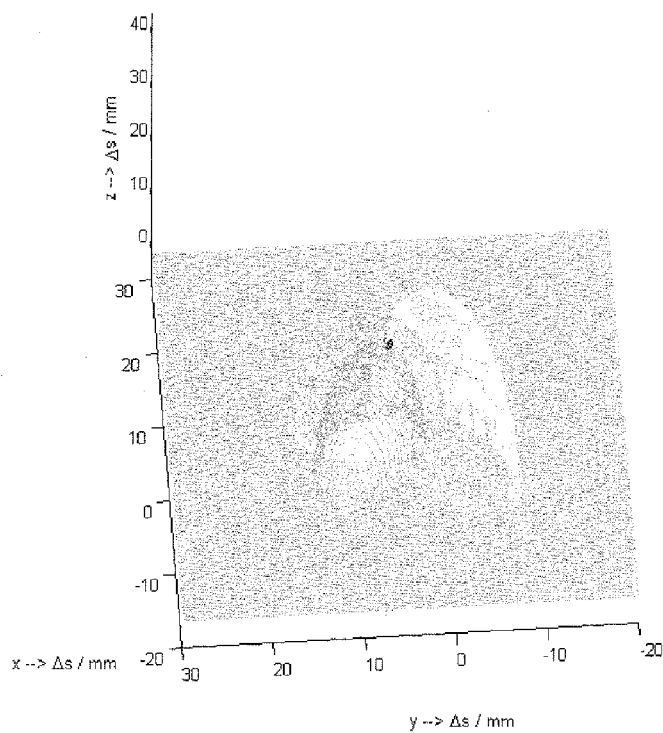
FIG. 16 illustrates the intersection of three iso-output surfaces having the shape of a rotated ellipsoid.

FIG. 16 illustrates a case of unique intersection between three rotated semi-ellipsoids.

In conclusion of what is set forth above, it may be stated that the method and the device of the present invention make it possible, by virtue of the use of three or more sensors of a known type, to achieve, in an easy and inexpensive way, a high precision of response, eliminating completely the indeterminacy proper to measurement devices of this type which use a single sensor.

The invention claimed is:

1. A method for determining a relative position of two elements that are mobile with respect to one another, the method comprising applying a field source to a first of the two elements and a meter to a second of the two elements for supplying, according to a measurement of a field of forces from the field source, a response identifying the relative position of the first element with respect to the second element; wherein measuring the field of forces is executed by using at least three sensors ($s_1, s_2, s_3$) arranged in respective distinct points ($P_1, P_2, P_3$) of the second element that supply respective outputs ($x_1, x_2, x_3$) representing values of the field of forces at the points ($P_1, P_2, P_3$); wherein the method includes computing, for each sensor ($s_1, s_2, s_3$), a respective iso-output surface formed by a locus of the points that, if occupied by the source, would result in the sensor ($s_1; s_2; s_3$) issuing a same output ($x_1, x_2, x_3$).

2. The method according to claim 1, wherein the response is obtained by determining a point of intersection of the iso-output surfaces with one another.

3. The method according to claim 1, in which the field of forces is a magnetic field.

4. The method according to claim 1, in which one of the elements is mobile and the other is fixed.

5. The method according to claim 1, in which the first element is mobile and the second element is fixed.

6. A device for determining the relative position of two elements that are mobile with respect to one another, the device comprising a source of a field of forces that can be applied to a first of the two elements, and a meter, to be applied to a second of the two elements for measuring the field of forces and supply, as a function of the measurement of the field of forces, a response identifying the relative position of the first element with respect to the second element; wherein the meter comprises at least three sensors ($s_1, s_2, s_3$) that can be applied to respective distinct points ($P_1, P_2, P_3$) of the second element for supplying respective outputs ($x_1, x_2, x_3$) as a function of the measurement of the field of forces at those points ($P_1, P_2, P_3$); and comprising a processing unit capable of comparing the outputs ($x_1, x_2, x_3$) with one another for supplying said response, wherein the processing unit is for obtaining, for each sensor ($s_1; s_2; s_3$), a respective iso-output surface formed by the locus of the points ($P_1, P_2, P_3$) that, if occupied by the source, would result in the sensor ($s_1; s_2; s_3$) issuing a same output ($x_1; x_2; x_3$).

7. The device according to claim 6, in which the processing unit is designed for comparing the outputs ($x_1, x_2, x_3$) so as to determine a point of intersection of the iso-output surfaces with one another.

8. The device according to claim 6, in which the field of forces is a magnetic field.

9. The device according to claim 6, in which one of the elements is mobile and the other is fixed.

10. The device according to claim 6, in which the first element is mobile and the second element is fixed.

11. An internal-combustion engine comprising two elements that are mobile with respect to one another and a device as claimed in claim 6.

12. The engine according to what is claimed in claim 11, in which one of the elements is mobile and the other is fixed; said source of a field of forces being applied to the mobile element.

13. A computer readable medium product that does not consist of a signal having stored thereon instructions that when read by a processor cause the processor to execute the method according to claim 1 when the computer readable medium product is run on said processor.

* * * * *